Jan. 8, 1929.  
L. EMANUELI  
1,698,050  
CABLE FOR TRANSMITTING ELECTRICAL ENERGY  
Filed April 20, 1925

Inventor:  
Luigi Emanueli  
By  
Attorney.

Patented Jan. 8, 1929.

1,698,050

UNITED STATES PATENT OFFICE.

LUGI EMANUELI, OF MILAN, ITALY, ASSIGNOR TO THE FIRM PIRELLI & C., OF MILAN, ITALY.

CABLE FOR TRANSMITTING ELECTRICAL ENERGY.

Application filed April 20, 1925, Serial No. 24,613, and in Germany May 19, 1924.

The present invention relates to improvements in cables for transmitting electrical energy.

When laying electric cables it is sometimes necessary to form very sharp bends in the cable. In large cables comprising a number of conductors, this bending tends to displace the conductors from their proper positions relative to one another, according to the curvature imposed on the cable. The interposed packing of the cable tends also to be displaced, thus leaving spaces containing only material with which said packings have been impregnated or residual gases or vapours which may be formed in the cable, and these spaces are just at those points where the electrical stresses are greatest and where it is therefore necessary to have a very high dielectric strength.

This is a very series disadvantage where high tension cables are use, and it cannot be overcome by reinforcing the exterior insulation surrounding the group of separate insulated conductors, because even though this be applied with extreme care during manufacture it is insufficiently rigid, after the impregnating and drying operations, to prevent displacement of the conductors when the cable is bent. Furthermore it is necessary from the point of view of economy to keep the volume of such a reinforcement of the outer insulation as small as possible, thus reducing its mechanical capacity for supporting the conductors. The lead sheath which protects the exterior of the cable is also insufficient, on account of its pliability, to overcome the tendency to displacement of the component parts of the cable.

According to the present invention a strengthening wrapping is interposed between the body or core of the cable proper and the lead sheath which protects the exterior.

Figure 1:
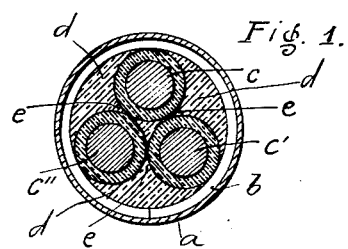
Figure 2:
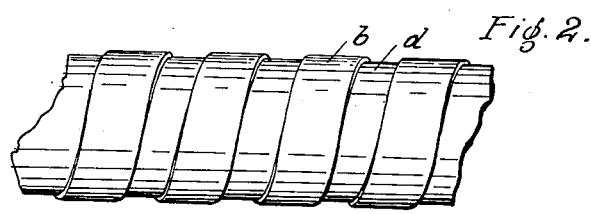
Figure 3:
Figure 4:

The invention is illustrated by way of example in the accompanying drawing in which Fig. 1 shows a section of a cable comprising three conductors to which said wrapping has been applied, Fig. 2 is an elevation showing how the wrapping is applied, and Figs. 3 and 4 are sectional views of two forms of metal band used to form the wrapping.

The drawings illustrate that method of carrying out the invention which has been found preferable in practice, and in which a metal band or ribbon $b$ of suitably chosen dimensions is helically wound around the group of conductors $c, c', c''$ which form the cable, before the lead sheath $a$ is applied. The pitch of the wound band or the distance between consecutive turns is so chosen as to permit the subsequent proper impregnation of the cable (see Fig. 2).

This wound band has the effect of preventing any displacement of the conductors, so that gaps cannot be formed in the filled spaces $d$ or at the points $e$ where the formation of such gaps would present the greatest danger.

In order to eliminate any risks due to sharp edges (which give rise to very irregular distribution and in the proximity of which high potential gradients exist), it is desirable to round those edges of the band which contact with the insulating covering, in the manner shown for example in section in Fig. 3. The edges of the band may also for example be turned slightly towards the outside of the cable as shown in Fig. 4, the operation of turning the edges out being carried out by means of the same apparatus which winds the band tightly upon the cable.

It should be understood that materials comprising textile fibres, metallized paper and the like are quite unsuitable for use in carrying out the present invention, only materials possessing great mechanical strength being employed.

I claim as my invention:

1. A cable for transmitting electrical energy, comprising a plurality of insulated conductors disposed side by side; a single metallic strip wound spirally around and in direct contact with the conductors, but with adjacent convolutions spaced widely from one another, to bind said conductors together and prevent the formation of empty spaces in the cable, while permitting relative slippage between the conductors when the cable is bent, said strip having its inner edges rounded away from the conductors; and a lead sheath encasing said conductors and binding strip and in direct contact with the latter.

2. A cable according to claim 1, in which the rounded edges of the binding strip are turned outwardly away from the conductors.

3. A cable for transmitting electrical energy, comprising a plurality of insulated conductors disposed side by side; a single metallic binding strip wound spirally around the conductors with adjacent convolutions out of contact with one another, said strip having its inner edges rounded away from the conductors; and a lead sheath encasing said conductors and binding strip.

4. A cable for transmitting electrical energy, comprising a plurality of insulated conductors disposed side by side; a single metallic binding strip wound spirally around the conductors with adjacent convolutions out of contact with one another, said strip having its inner edges rounded and turned outwardly away from the conductors; and a lead sheath encasing said conductors and binding strip.

In testimony whereof I affix my signature.

LUIGI EMANUELI.